(12) United States Patent
Kouda et al.

(10) Patent No.: US 10,570,775 B2
(45) Date of Patent: Feb. 25, 2020

(54) TURBO MACHINE

(71) Applicant: Panasonic Intellectual Property Management Co., Ltd., Osaka (JP)

(72) Inventors: Kazuyuki Kouda, Gumma (JP); Hidetoshi Taguchi, Osaka (JP); Akira Hiwata, Shiga (JP); Takeshi Ogata, Osaka (JP); Tadayoshi Shoyama, Osaka (JP); Hiroshi Hasegawa, Saitama (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 662 days.

(21) Appl. No.: 15/159,998

(22) Filed: May 20, 2016

(65) Prior Publication Data

US 2017/0009602 A1 Jan. 12, 2017

(30) Foreign Application Priority Data

Jul. 8, 2015 (JP) .................................. 2015-137135

(51) Int. Cl.
| | | |
|---|---|---|
| *F01D 25/16* | (2006.01) | |
| *F04D 29/66* | (2006.01) | |
| *F16C 27/06* | (2006.01) | |
| *F04D 29/056* | (2006.01) | |
| *F16C 17/10* | (2006.01) | |

(Continued)

(52) U.S. Cl.
CPC ........... *F01D 25/164* (2013.01); *F01D 25/04* (2013.01); *F04D 29/056* (2013.01); *F04D 29/668* (2013.01); *F16C 17/10* (2013.01); *F16C 27/063* (2013.01); *F04D 29/026* (2013.01); *F05D 2220/31* (2013.01); *F05D 2220/32* (2013.01); *F05D 2220/40* (2013.01); *F05D 2240/50* (2013.01); *F05D 2240/60* (2013.01)

(58) Field of Classification Search
None
See application file for complete search history.

(56) References Cited

U.S. PATENT DOCUMENTS

| 4,955,791 A | 9/1990 | Wrobel |
|---|---|---|
| 2008/0232985 A1* | 9/2008 | Koci .................... F04D 19/042 417/423.13 |
| 2011/0081231 A1 | 4/2011 | Hoelzer et al. |

FOREIGN PATENT DOCUMENTS

JP 2011-149390 8/2011

OTHER PUBLICATIONS

The Extended European Search Report dated Nov. 29, 2016 for the related European Patent Application No. 16171970.3.

* cited by examiner

*Primary Examiner* — Christopher Verdier
*Assistant Examiner* — Juan G Flores
(74) *Attorney, Agent, or Firm* — McDermott Will & Emery LLP (57) ABSTRACT

A turbo machine of the present disclosure includes a cylindrical bearing housing, a rotation shaft, a bearing, a bearing holder, and an end elastic body. The rotation shaft is located in the bearing housing. The bearing rotatably supports the rotation shaft at least in a radial direction of the rotation shaft. The bearing holder faces one end of the bearing and is fixed to the bearing housing. The end elastic body is disposed between the one end of the bearing and the bearing holder in the axial direction of the bearing and is in contact with the bearing and the bearing holder. The end elastic body (Continued)

is formed of a material having a lower modulus of elasticity than a material forming the bearing holder.

8 Claims, 8 Drawing Sheets

(51) Int. Cl.
    *F01D 25/04*     (2006.01)
    *F04D 29/02*     (2006.01)

-- PRIOR ART --

TURBO MACHINE

BACKGROUND

1. Technical Field

The present disclosure relates to turbo machines.

2. Description of the Related Art

Various bearing structures have been developed for turbo machines.

Figure 11:
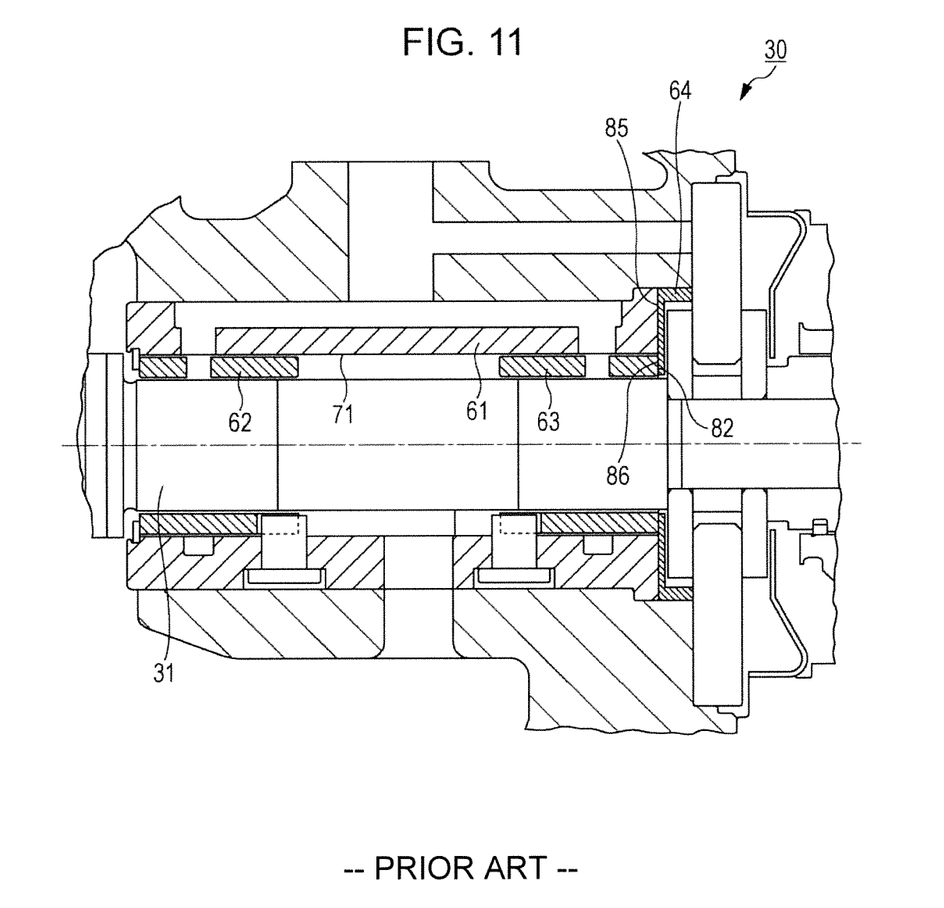
FIG. 11 is a cross-sectional view illustrating a bearing structure of a conventional turbo machine.

As illustrated in FIG. 11, for example, Japanese Unexamined Patent Application Publication No. 2011-149390 discloses a supercharger including a turbine shaft 31, a bearing housing 30, a bearing 62, a bearing 63, a bearing retainer 61, and a bearing holder 64. The supercharger is a turbo machine. The bearings 62 and 63 rotatably support the turbine shaft 31. The bearing retainer 61 is disposed in the bearing housing 30 and has a hole 71 in which the bearings 62 and 63 are disposed. The bearing holder 64 includes a bearing confronting portion 86. The bearing confronting portion 86 is positioned outside the bearing retainer 61 and faces an axial end 82 of the bearing 63. A confronting surface 85 of the bearing holder 64, which faces the bearing retainer 61, is in contact with a rear end of the bearing retainer 61. In addition, the axial end 82 of the bearing 63 is positioned at the same position with the rear end of the bearing retainer 61 in the front-rear direction. Thus, the axial end 82 of the bearing 63 is in contact with the bearing holder 64.

The bearing 63 is positioned close to the end of the hole 71 in the bearing retainer 61 compared with bearings of conventional turbo machines. This configuration allows adjacent bearings to be spaced at larger intervals, leading to an improvement in vibration damping characteristics, and as a result, provides high rotation stability.

SUMMARY

The supercharger, which is the turbo machine, described in Japanese Unexamined Patent Application Publication No. 2011-149390 has room for improvement with respect to reliability. One non-limiting and exemplary embodiment provides a turbo machine having high reliability.

In one general aspect, the techniques disclosed here feature a turbo machine including: a cylindrical bearing housing; a rotation shaft that is located in the bearing housing; a bearing that is disposed between an inner surface of the bearing housing and an outer surface of the rotation shaft, that rotatably supports the rotation shaft at least in a radial direction of the rotation shaft, and that has one end in an axial direction of the bearing, the one end being located in the bearing housing; a bearing holder that is fixed to one end of the bearing housing in the axial direction of the bearing and that faces the one end of the bearing; and an end elastic body that is disposed between the one end of the bearing and the bearing holder in the axial direction of the bearing, that is in contact with the bearing and the bearing holder, and that is formed of a material having a lower modulus of elasticity than a material forming the bearing holder.

The above-described turbo machine has high reliability.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Turbo machines such as a turbo supercharger, a gas turbine, a steam turbine, and a turbo compressor operate at certain critical speeds so as to be in a rated operation. When the turbo machine operates at a critical speed, the amplitude of vibration of the rotation shaft is large. Vibrations may be caused by forces such as a force generated due to a rotational member being unbalanced, an electromagnetic excitation force generated by a motor that rotates the rotation shaft, and a fluid excitation force acting on an impeller. If the vibrations are not properly damped (reduced), the bearing may be damaged, or the turbo machine may be broken.

In the technology described in Japanese Unexamined Patent Application Publication No. 2011-149390, since the bearing holder 64 is in contact with the bearing 63, a restraining force acting on the bearing 63 in a radial direction is large. This configuration suppresses the bearing 63 from moving, and thus vibrations are unlikely to be sufficiently reduced. Thus, vibrations of the rotation shaft in the radial direction may be increased by forces such as a force generated due to the rotational member being unbalanced, an electromagnetic excitation force generated by a motor that rotates the rotation shaft, and a fluid excitation force acting on the impeller. This may result in a significant deterioration in the reliability of the turbo machine.

A first aspect of the present disclosure provides a turbo machine including:

a cylindrical bearing housing;

a rotation shaft that is located in the bearing housing;

a bearing that is disposed between an inner surface of the bearing housing and an outer surface of the rotation shaft, that rotatably supports the rotation shaft at least in a radial direction of the rotation shaft, and that has one end in an axial direction of the bearing, the one end being located in the bearing housing;

a bearing holder that is fixed to one end of the bearing housing in the axial direction of the bearing and that faces the one end of the bearing; and an end elastic body that is disposed between the one end of the bearing and the bearing holder in the axial direction of the bearing, that is in contact with the bearing and the bearing holder, and that is formed of a material having a lower modulus of elasticity than a material forming the bearing holder.

According to the first aspect, since the one end of the bearing is not in contact with the bearing holder, but is in contact with the end elastic body, the bearing readily moves in the radial direction. Thus, vibrations are readily reduced. With this configuration, the turbo machine according to the first aspect has high reliability.

A second aspect of the present disclosure according to the first aspect provides the turbo machine wherein at least one of the one end of the bearing and a surface of the holder that is in contact with the end elastic body has a front recess that houses a portion of the end elastic body. According to the second aspect, the end elastic body is readily positioned in the radial direction of the bearing.

A third aspect of the present disclosure according to the first aspect or the second aspect provides the turbo machine further including at least one side elastic body that is disposed in a ring-shaped space formed between the inner surface of the bearing housing and the outer surface of the bearing and that is formed of a material having a lower modulus of elasticity than a material forming the inner surface of the bearing housing. According to the third aspect, the end elastic body allows the bearing to readily move in the radial direction, while the side elastic body reduces vibrations effectively.

A fourth aspect of the present disclosure according to the third aspect provides the turbo machine wherein the at least one side elastic body includes a plurality of side elastic bodies, and the plurality of side elastic bodies are arranged in the axial direction of the bearing in the ring-shaped space. According to the fourth aspect, a tilt of the bearing during vibration is small, and thus a pressure distribution of a lubricant in the axial direction of the bearing is likely to be spatially uniform.

A fifth aspect of the present disclosure according to the third or fourth aspect provides the turbo machine wherein at least one of the inner surface of the bearing housing and the outer surface of the bearing includes a side recess that houses a portion of the side elastic body. According to the fifth aspect, the side elastic body is readily positioned in the axial direction of the bearing.

A sixth aspect of the present disclosure according to any one of the first to fifth aspects provides the turbo machine wherein the bearing includes a flange having the one end and a rear end, the one end and the rear end facing opposite directions, the inner surface of the bearing housing has a radial surface facing the rear end, and the turbo machine further includes a rear elastic body that is disposed between the rear end and the radial surface in the axial direction of the bearing, that is in contact with the bearing and the bearing housing, and that is formed of a material having a lower modulus of elasticity than a material forming the inner surface of the bearing housing. According to the sixth aspect, since the rear end of the bearing is in contact with the rear elastic body, the bearing more readily moves in the radial direction. As a result, vibrations are further reduced.

A seventh aspect of the present disclosure according to any one of the first to sixth aspects provides the turbo machine wherein a gap is formed between the inner surface of the bearing housing and the end elastic body over an entire circumference of the end elastic body. According to the seventh aspect, the end elastic body is unlikely to be in contact with the inner surface of the bearing housing, and thus the bearing readily moves in the radial direction. As a result, vibrations are further reduced. The end elastic body, which is in contact with the bearing, may thermally expand when the temperature of the bearing increases as the rotational speed of the rotation shaft increases, for example. In such a case, the configuration according to the seventh aspect prevents a restraining force acting on the bearing in the radial direction from increasing.

An eighth aspect of the present disclosure according to any one of the first to seventh aspects provides the turbo machine further including a viscous substance that is disposed in a ring-shaped space formed between the inner surface of the bearing housing and the outer surface of the bearing and that has a viscosity of 1 mPa·s to 24 mPa·s at a temperature of 20° C. According to the eighth aspect, vibrations are readily reduced by a squeeze effect of the viscous substance disposed in the ring-shaped space.

Hereinafter, embodiments of the present disclosure are described with reference to the drawings. The following description relates to an example of the present disclosure and does not limit the present disclosure.

First Embodiment

Turbo Machine

Figure 1:
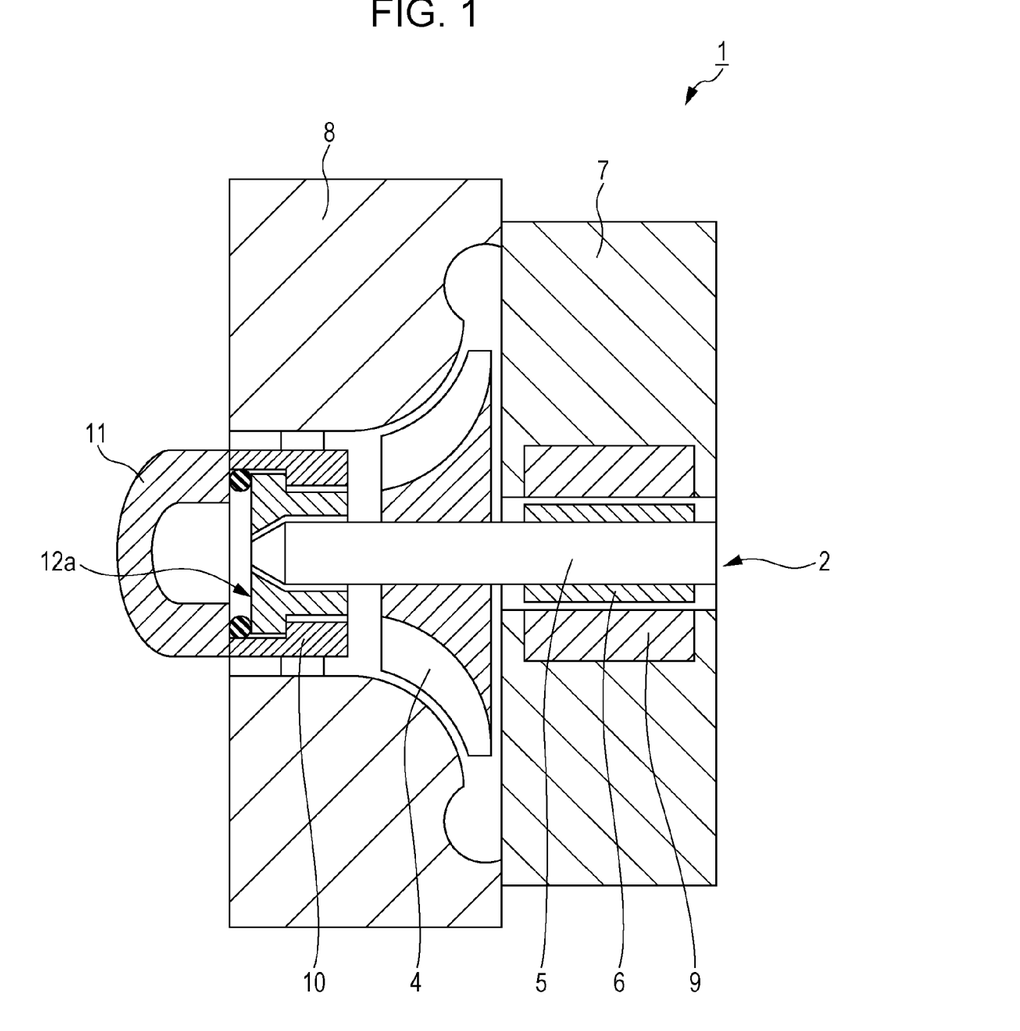
FIG. 1 is a cross-sectional view illustrating an example of a turbo machine of the present disclosure.

As illustrated in FIG. 1, a turbo machine 1 includes a cylindrical bearing housing 10, a rotation shaft 5, a bearing structure 12a, and a bearing holder 11. The rotation shaft 5 is located in the bearing housing 10. The turbo machine 1 further includes an impeller 4, a motor rotor 6, a motor housing 7, a turbo mechanism housing 8, and a motor stator 9, for example. The impeller 4 is fixed to the rotation shaft 5 so as to be rotated with the rotation shaft 5. The motor rotor 6 is coaxially attached to the rotation shaft 5. The rotation shaft 5 rotates with the motor rotor 6. The impeller 4, the rotation shaft 5, and the motor rotor 6 constitute a rotational member 2. The motor stator 9 is fixed in the motor housing 7. The motor stator 9 is positioned so as to directly face the motor rotor 6 in a radial direction of the motor rotor 6. The motor rotor 6 and the motor stator 9 constitute a motor. The motor rotor 6 rotates when electricity is supplied to the motor. This rotates the rotation shaft 5.

The turbo mechanism housing 8 houses the impeller 4. The turbo mechanism housing 8 has a passage for a working fluid passing through the impeller 4. The impeller 4 converts a driving force generated by the rotation of the rotation shaft 5 into kinetic energy of the working fluid. In the turbo machine 1, the impeller 4 may convert the kinetic energy of the working fluid into rotational power. In such a case, the turbo machine 1 includes a power generator, for example, so as to convert the rotational power into electric energy.

In the turbo mechanism housing 8, the bearing housing 10 is disposed on the front side of the impeller 4. The bearing housing 10 houses the bearing structure 12a. In addition, the bearing housing 10 fixes the bearing holder 11 in position. The bearing holder 11 supports the bearing structure 12a in the axial direction. The bearing holder 11 is fixed to the bearing housing 10 with a bolt, for example. This restrains axial movement of the bearing structure 12a.

Bearing Structure

Figure 2:
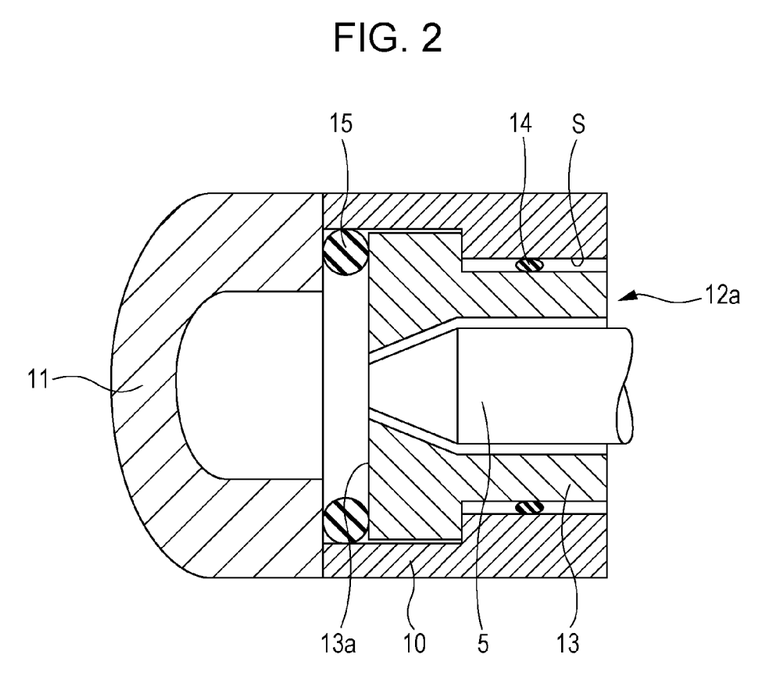
FIG. 2 is a cross-sectional view illustrating a bearing structure according to a first embodiment.

As illustrated in FIG. 2, the bearing structure 12a includes a bearing 13 and an end elastic body 15. The bearing 13 is disposed between an inner surface of the bearing housing 10 and an outer surface of the rotation shaft 5 and rotatably supports the rotation shaft 5 at least in a radial direction of the rotation shaft 5. The bearing 13 has one end 13a in the axial direction of the bearing 13. The one end 13a is located in the bearing housing 10. The bearing holder 11 is fixed to one end of the bearing housing 10 in the axial direction of the bearing 13 and faces the one end 13a of the bearing 13. The end elastic body 15 is disposed between the one end 13a of the bearing 13 and the bearing holder 11 in the axial direction of the bearing 13 and is in contact with the bearing 13 and the bearing holder 11. In addition, the end elastic body 15 is formed of a material having a lower modulus of elasticity than a material forming the bearing holder 11. Herein, the modulus of elasticity is Young's modulus. Since the one end 13a of the bearing 13 is not in contact with the bearing holder 11, but is in contact with the end elastic body 15, the bearing 13 readily moves in the radial direction of the bearing 13. With this configuration, the bearing structure 12a readily reduces vibrations. The end elastic body 15 is an O-ring formed of a rubber such as a nitrile rubber, for example. The end elastic body 15 may be a metal coil spring or a piston ring. Alternatively, the end elastic body 15 may be formed of a composite damping material including an elastic body such as flake graphite or a polymer material and a metal.

The bearing 13 has a substantially cylindrical shape and surrounds the rotation shaft 5. The bearing 13 is a plain bearing, for example. A lubricant is present between the inner surface of the bearing 13 and the outer surface of the rotation shaft 5 while the turbo machine 1 is in operation. Compared with a rolling bearing, the plain bearing readily exhibits vibration damping effect, and thus the plain bearing readily reduces vibrations. A predetermined space is formed between the inner surface of the bearing 13 and the outer surface of the rotation shaft 5. A predetermined space is formed between the outer surface of the bearing 13 and the inner surface of the bearing housing 10. The space between the outer surface of the bearing 13 and the inner surface of the bearing housing 10 is a ring-shaped space S, for example.

As illustrated in FIG. 2, a portion of the rotation shaft 5 supported by the bearing 13 includes a straight portion having a constant outer diameter and a tapered portion having an outer diameter decreasing gradually toward an end of the rotation shaft 5. The bearing 13 has a non-tapered hole and a tapered hole extending continuously in the bearing 13. The non-tapered hole of the bearing 13 has a constant inner diameter and constitutes a portion of the inner surface of the bearing 13 that faces the straight portion of the rotation shaft 5. The tapered hole of the bearing 13 has an inner diameter decreasing gradually toward the end of the rotation shaft 5 and constitutes a portion of the inner surface of the bearing 13 that faces the tapered portion of the rotation shaft 5. With this configuration, the bearing 13 supports a load in the axial direction of the rotation shaft 5 (thrust load), in addition to the load in the radial direction of the rotation shaft 5 (radial load).

As illustrated in FIG. 2, the bearing structure 12a further includes a side elastic body 14, for example. The side elastic body 14 is disposed in the ring-shaped space S formed between the inner surface of the bearing housing 10 and the outer surface of the bearing 13. The side elastic body 14 is formed of a material having a lower modulus of elasticity than a material forming the inner surface of the bearing housing 10. The side elastic body 14 is in contact with the outer surface of the bearing 13 and the inner surface of the bearing housing 10 and supports the bearing 13. The side elastic body 14 is an O-ring formed of a rubber such as a nitrile rubber, for example. The end elastic body 15 positions the bearing 13 at a predetermined position in the axial direction. In addition, the restraining force acting on the bearing 13 in the radial direction is reduced by the end elastic body 15. With this configuration, the bearing 13 readily moves in the radial direction, and the side elastic body 14 exhibits effective vibration damping characteristics. As a result, the turbo machine 1 has high reliability. The side elastic body 14 may be a metal coil spring or a piston ring. The side elastic body 14 may be formed of a composite damping material including an elastic body such as flake graphite or a polymer material and a metal.

The bearing structure 12a may be modified from various perspectives. The bearing 13 may be configured to rotatably support the rotation shaft 5 only in the radial direction, for example. In such a case, the bearing structure 12a may further include a thrust bearing that supports the rotation shaft 5 in the axial direction.

Figure 3A:
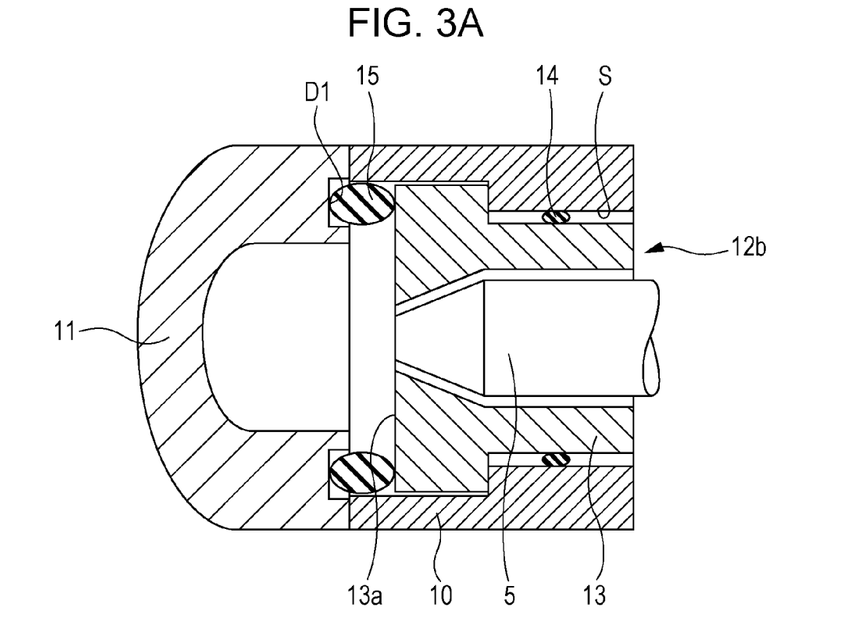
FIG. 3A is a cross-sectional view illustrating a bearing structure according to a modification.

The bearing structure 12a may be modified to a bearing structure 12b illustrated in FIG. 3A. The bearing structure 12b has the same configuration as the bearing structure 12a unless otherwise specified. As illustrated in FIG. 3A, the bearing holder 11, which is used together with the bearing structure 12b, has a front recess D1 in the surface that is in contact with the end elastic body 15. The front recess D1 houses a portion of the end elastic body 15. The front recess D1 extends circularly about an axis of the bearing 13 in the surface of the bearing holder 11 that is in contact with the end elastic body 15, for example.

Figure 3B:
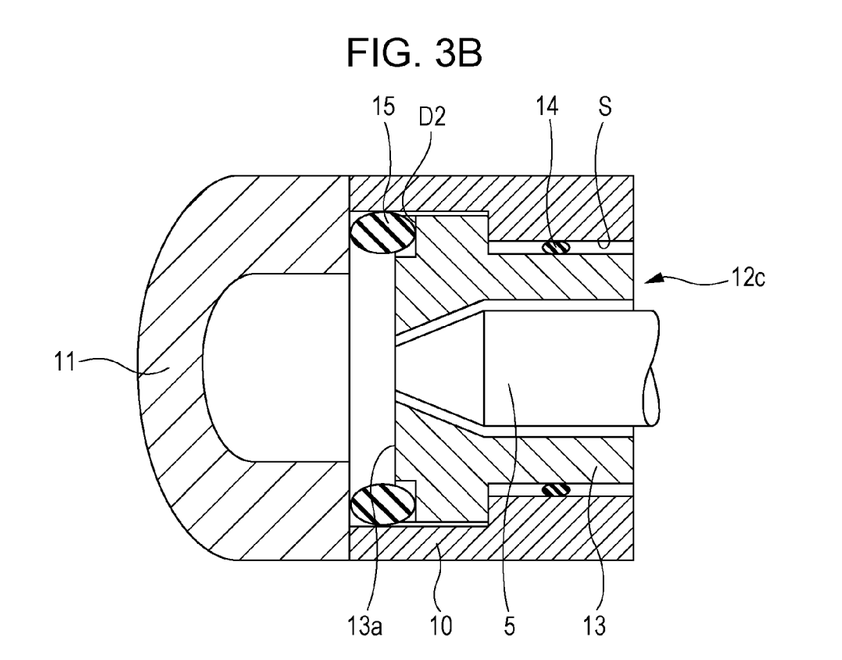
FIG. 3B is a cross-sectional view illustrating a bearing structure according to a modification.

The bearing structure 12a may be modified to a bearing structure 12c illustrated in FIG. 3B. The bearing structure 12c has the same configuration as the bearing structure 12a unless otherwise specified. As illustrated in FIG. 3B, the one end 13a of the bearing 13 of the bearing structure 12c includes a front recess D2. The front recess D2 houses a portion of the end elastic body 15. The front recess D2 extends circularly about the axis of the bearing 13 in the one end 13a of the bearing 13, for example.

In the bearing structure 12b and the bearing structure 12c, the end elastic body 15 is readily positioned in the radial direction of the bearing 13.

Figure 4A:
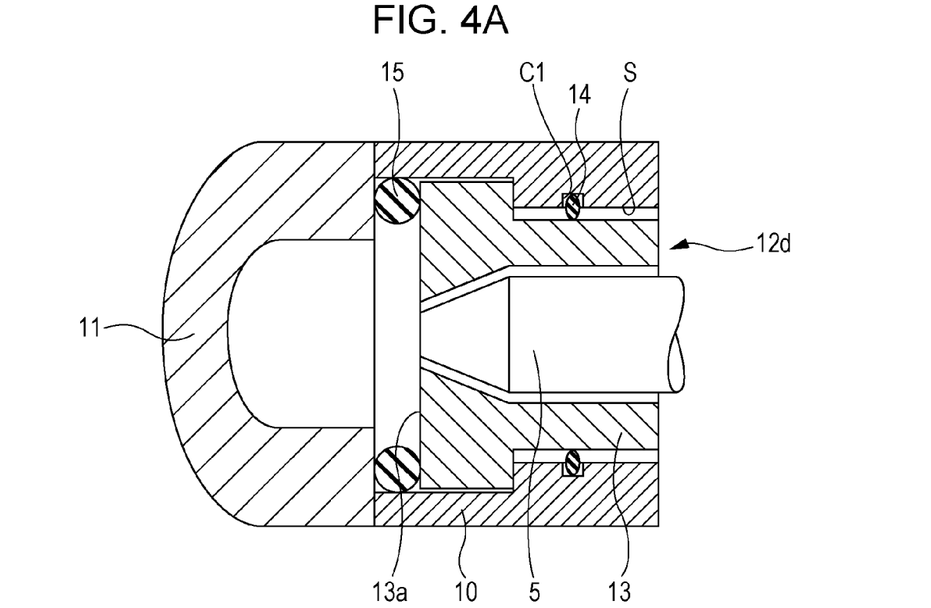
FIG. 4A is a cross-sectional view illustrating a bearing structure according to a modification.

The bearing structure 12a may be modified to a bearing structure 12d illustrated in FIG. 4A. The bearing structure 12d has the same configuration as the bearing structure 12a unless otherwise specified. As illustrated in FIG. 4A, the inner surface of the bearing housing 10, which is used together with the bearing structure 12d, has a side recess C1. The side recess C1 houses a portion of the side elastic body 14. The side recess C1 extends circularly about the axis of the bearing 13 in the inner surface of the bearing housing 10, for example.

Figure 4B:
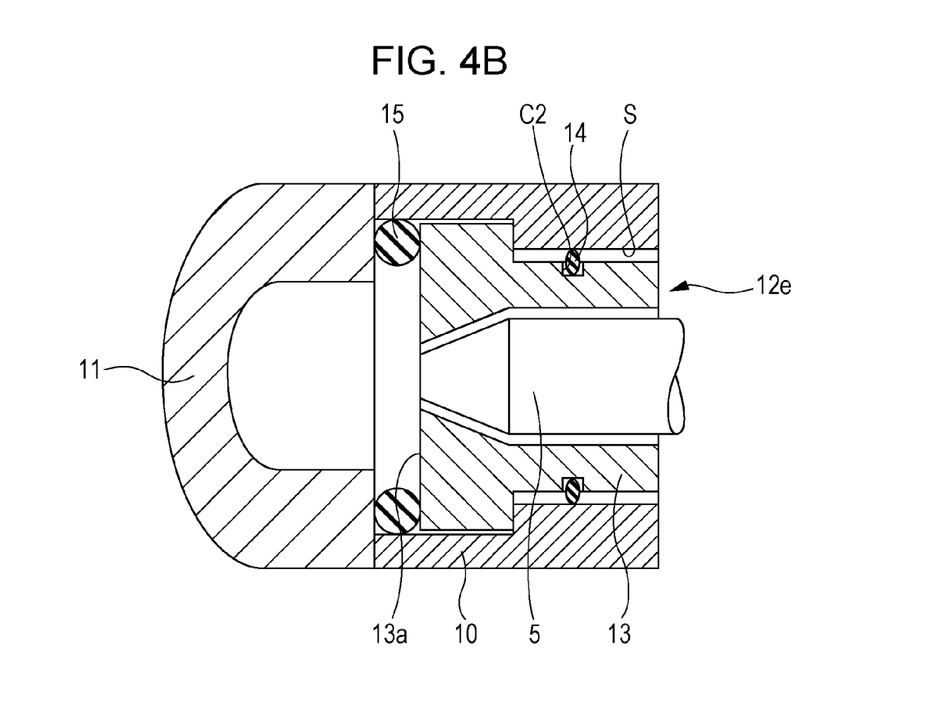
FIG. 4B is a cross-sectional view illustrating a bearing structure according to a modification.

The bearing structure 12a may be modified to a bearing structure 12e illustrated in FIG. 4B. The bearing structure 12e has the same configuration as the bearing structure 12a unless otherwise specified. As illustrated in FIG. 4B, the outer surface of the bearing 13 of the bearing structure 12e has a side recess C2. The side recess C2 houses a portion of the side elastic body 14. The side recess C2 extends circularly about the axis of the bearing 13 in the outer surface of the bearing 13, for example.

In the bearing structure 12*d* and the bearing structure 12*e*, the side elastic body 14 is readily positioned in the axial direction of the bearing 13.

Figure 5:
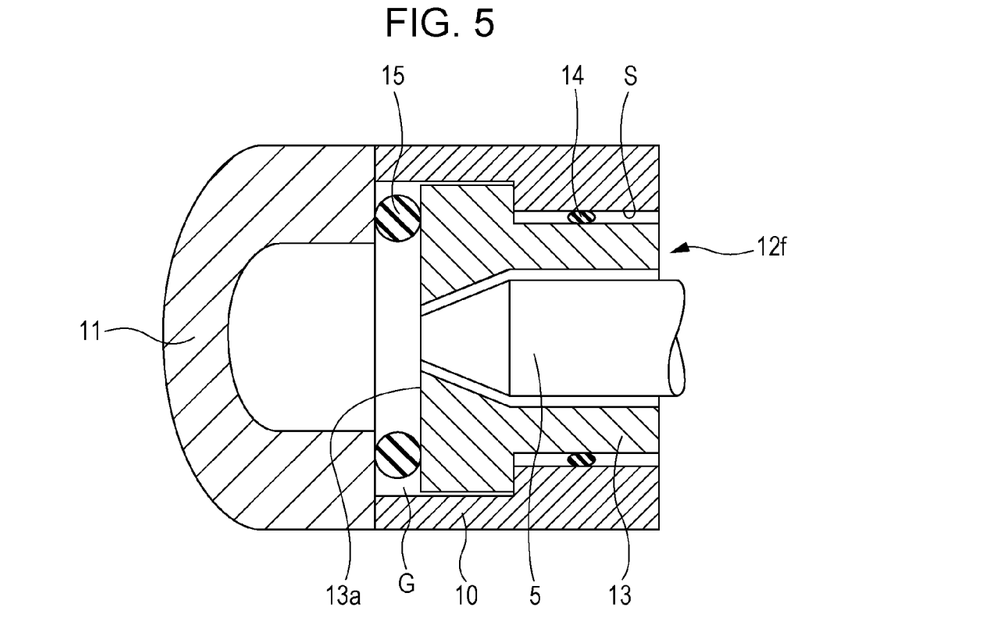
FIG. 5 is a cross-sectional view illustrating a bearing structure according to a modification.

The bearing structure 12*a* may be modified to a bearing structure 12*f* illustrated in FIG. 5. In the bearing structure 12*f*, a gap G is formed between the inner surface of the bearing housing 10 and the end elastic body 15 over the entire circumference of the end elastic body 15. In the bearing structure 12*f*, the end elastic body 15 is not in contact with the inner surface of the bearing housing 10, and thus the restraining force acting on the bearing 13 in the radial direction is reduced. This allows the bearing 13 to readily move in the radial direction. With this configuration, the side elastic body 14 exhibits effective vibration damping characteristics. In particular, the end elastic body 15, which is in contact with the bearing 13, may thermally expand when the temperature of the bearing 13 increases as the rotational speed of the rotation shaft 5 increases. In such a case, this configuration prevents the restraining force acting on the bearing 13 in the radial direction from increasing. Thus, the bearing structure 12*f* reduces more vibrations in the radial direction of the rotation shaft 5 than the bearing structure 12*a*. The bearing structure 12*f* is particularly advantageous with respect to the increase in the rotational speed of the rotation shaft 5.

Second Embodiment

Figure 6:
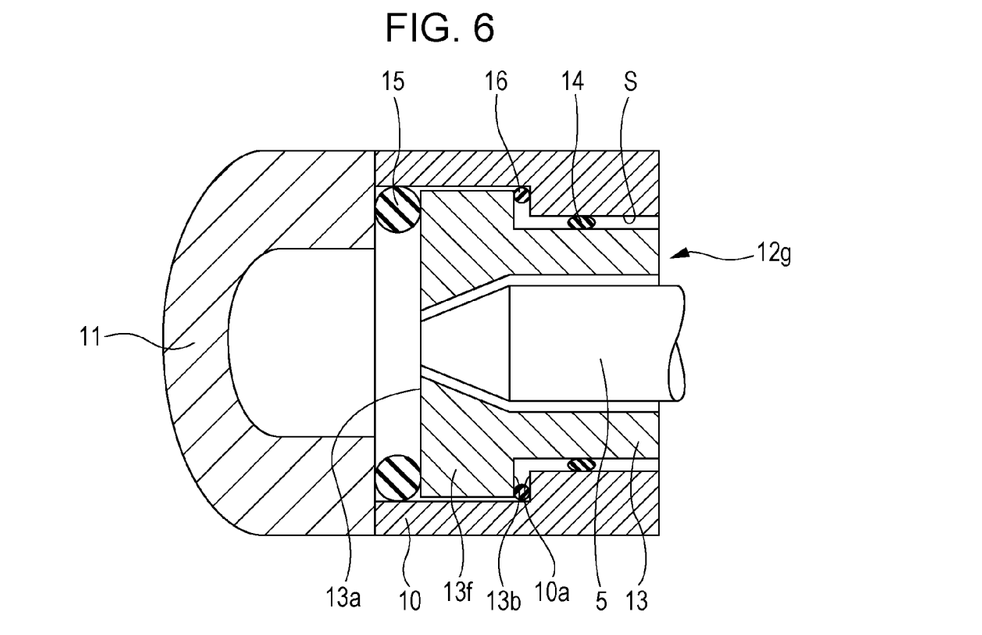
FIG. 6 is a cross-sectional view illustrating a bearing structure according to a second embodiment.

Next, a turbo machine according to a second embodiment is described. In the second embodiment, the turbo machine 1 includes a bearing structure 12*g* instead of the bearing structure 12*a*. The bearing structure 12*g* has the same configuration as the bearing structure 12*a* unless otherwise specified. Components of the turbo machine according to the second embodiment identical or corresponding to those of the turbo machine according to the first embodiment are assigned the same reference numerals as those in the first embodiment and are not described in detail. The explanation regarding the first embodiment is applicable to the second embodiment if no technical contradiction occurs.

As illustrated in FIG. 6, the bearing 13 of the bearing structure 12*g* includes a flange 13*f* having the one end 13*a* and a rear end 13*b*. The one end 13*a* and the rear end 13*b* face opposite directions. In addition, the bearing housing 10 includes a radial surface 10*a* facing the rear end 13*b*. The bearing structure 12*g* further includes a rear elastic body 16. The rear elastic body 16 is positioned between the rear end 13*b* and the radial surface 10*a* in the axial direction of the bearing 13 and is in contact with the bearing 13 and the bearing housing 10. The rear elastic body 16 is formed of a material having a lower modulus of elasticity than a material forming the inner surface of the bearing housing 10. The rear elastic body 16 is an O-ring formed of a rubber such as a nitrile rubber, for example. The rear elastic body 16 may be a metal coil spring or a piston ring. The rear elastic body 16 may be formed of a composite damping material including an elastic body such as flake graphite or a polymer material and a metal.

In the bearing structure 12*g*, the rear elastic body 16 reduces the restraining force acting on the bearing 13 in the radial direction. With this configuration, the bearing 13 readily moves in the radial direction, and thus vibrations are reduced effectively. In addition, the side elastic body 14 exhibits the vibration damping characteristics effectively. In particular, the side elastic body 14 exhibits effective vibration damping characteristics to the vibrations in the axial direction of the bearing 13 caused by pressure fluctuation such as pulsation of the working fluid due to surging.

The bearing structure 12*g* reduces more vibrations of the rotation shaft 5 in the radial direction than the bearing structure 12*a*. In addition, in the bearing structure 12*g*, vibrations in the axial direction of the bearing 13 are reduced effectively.

The bearing structure 12*g* may be modified from various perspectives. In the bearing structure 12*g*, at least one of the inner surface of the bearing housing 10 and the rear end 13*b* of the bearing 13 may have a rear recess that houses a portion of the rear elastic body 16. In such a case, the rear recess extends circularly about the axis of the bearing 13 in the inner surface of the bearing housing 10 or the rear end 13*b* of the bearing 13. With this configuration, the rear elastic body 16 is readily positioned in the radial direction of the bearing 13. In the bearing structure 12*g*, a gap may be formed between the inner surface of the bearing housing 10 and the rear elastic body 16 over the entire circumference of the rear elastic body 16.

Third Embodiment

Figure 7:
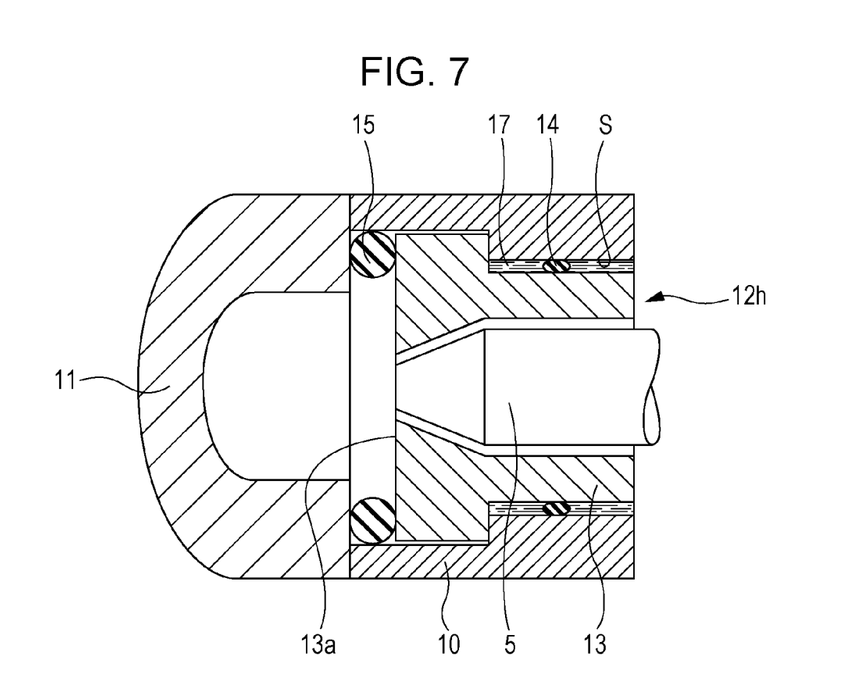
FIG. 7 is a cross-sectional view illustrating a bearing structure according to a third embodiment.

Next, a turbo machine according to a third embodiment is described. In the third embodiment, the turbo machine 1 includes a bearing structure 12*h* instead of the bearing structure 12*a*. The bearing structure 12*h* has the same configuration as the bearing structure 12*a* unless otherwise specified. Components of the turbo machine according to the third embodiment identical or corresponding to those of the turbo machine according to the first embodiment are assigned the same reference numerals as those in the first embodiment and are not described in detail. The explanation regarding the first embodiment is applicable to the third embodiment if no technical contradiction occurs.

As illustrated in FIG. 7, the bearing structure 12*h* further includes a viscous substance 17. The viscous substance 17 is disposed in the ring-shaped space S formed between the inner surface of the bearing housing 10 and the outer surface of the bearing 13. The viscous substance 17 is a fluid having a viscosity of 1 mPa·s to 24 m·Pas at a temperature of 20° C. The viscous substance 17 is water, for example. The viscous substance 17 may be oil.

The bearing structure 12*h* exhibits high vibration damping characteristics due to a squeeze effect of the viscous substance 17. The bearing structure 12*h* reduces more vibrations of the rotation shaft 5 in the radial direction than the bearing structure 12*a*. In addition, the bearing structure 12*h* prevents self-excited vibrations such as oil whirl and oil whip, which are peculiar to plain bearings. The bearing structure 12*b*, the bearing structure 12*c*, the bearing structure 12*d*, the bearing structure 12*e*, the bearing structure 12*f*, and the bearing structure 12*g* each may further include the viscous substance 17 in the ring-shaped space S as the bearing structure 12*h*.

Figure 8:
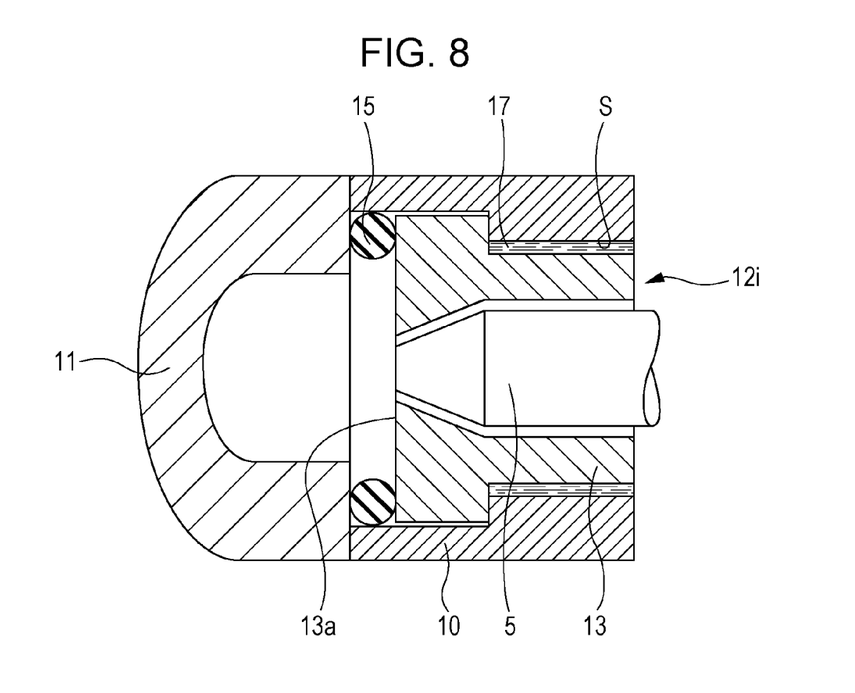
FIG. 8 is a cross-sectional view illustrating a bearing structure according to a modification.

The bearing structure 12*h* may be modified from various perspectives. The bearing structure 12*h* may be modified to a bearing structure 12*i* illustrated in FIG. 8, for example. The bearing structure 12*i* has the same configuration as the bearing structure 12*h* unless otherwise specified. The bearing structure 12*i* does not include the side elastic body 14. The bearing structure 12*i* exhibits high vibration damping characteristics as the bearing structure 12*h*. The bearing structure 12*i* exhibits higher vibration damping characteristics than the structure including only the side elastic body 14 without including the viscous substance 17 in the ring-shaped space S. Thus, the bearing structure 12*i* reduces more vibrations of the rotation shaft 5 in the radial direction than the bearing structure 12a. In addition, the bearing structure 12i prevents self-excited vibrations such as oil whirl and oil whip, which are peculiar to plain bearings.

Fourth Embodiment

Figure 9:
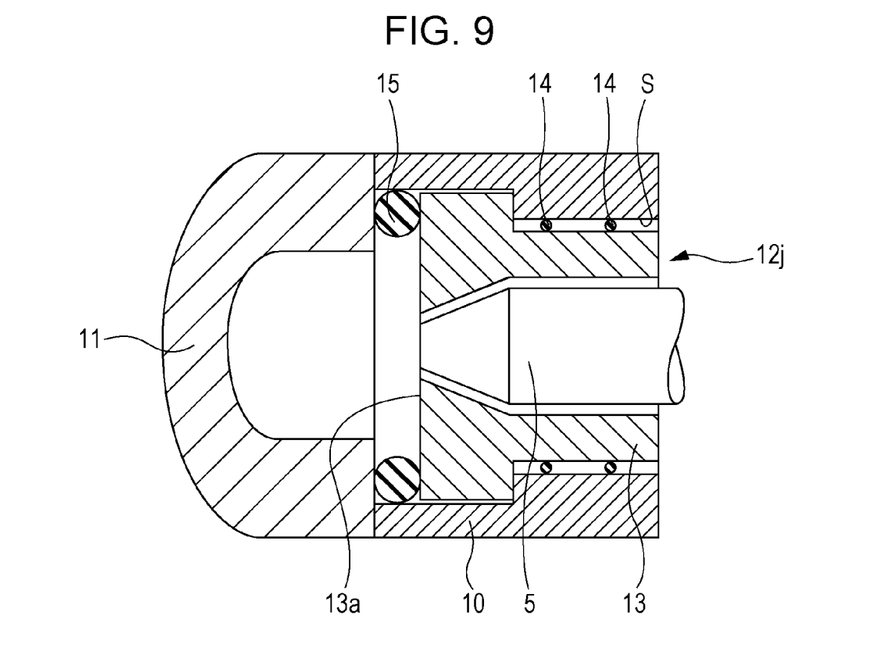
FIG. 9 is a cross-sectional view illustrating a bearing structure according to a fourth embodiment.

Next, a turbo machine according to a fourth embodiment is described. In the fourth embodiment, the turbo machine 1 includes a bearing structure 12j instead of the bearing structure 12a. The bearing structure 12j has the same configuration as the bearing structure 12a unless otherwise specified. Components of the turbo machine in the fourth embodiment identical or corresponding to those of the turbo machine according to the first embodiment are assigned the same reference numerals as those in the first embodiment and are not described in detail. The explanation regarding the first embodiment is applicable to the fourth embodiment if no technical contradiction occurs.

As illustrated in FIG. 9, the bearing structure 12j includes a plurality of side elastic bodies 14 (two side elastic bodies 14 in FIG. 9). The plurality of side elastic bodies 14 are arranged in the axial direction of the bearing 13 in the ring-shaped space S. In the bearing structure 12j, a tilt of the bearing 13 during the vibration is small. With this configuration, a pressure distribution of the lubricant, which is present between the inner surface of the bearing 13 and the outer surface of the rotation shaft 5, in the axial direction of the bearing 13 is likely to be spatially uniform. Compared with the bearing structure 12a, the bearing structure 12j has improved vibration damping characteristics due to the side elastic bodies 14, and thus vibrations of the rotation shaft 5 in the radial direction are further reduced. In addition, the rotation accuracy of the rotation shaft 5 is improved due to the uniform pressure distribution of the lubricant, and thus vibrations of the rotation shaft 5 in the radial direction are reduced.

Figure 10:
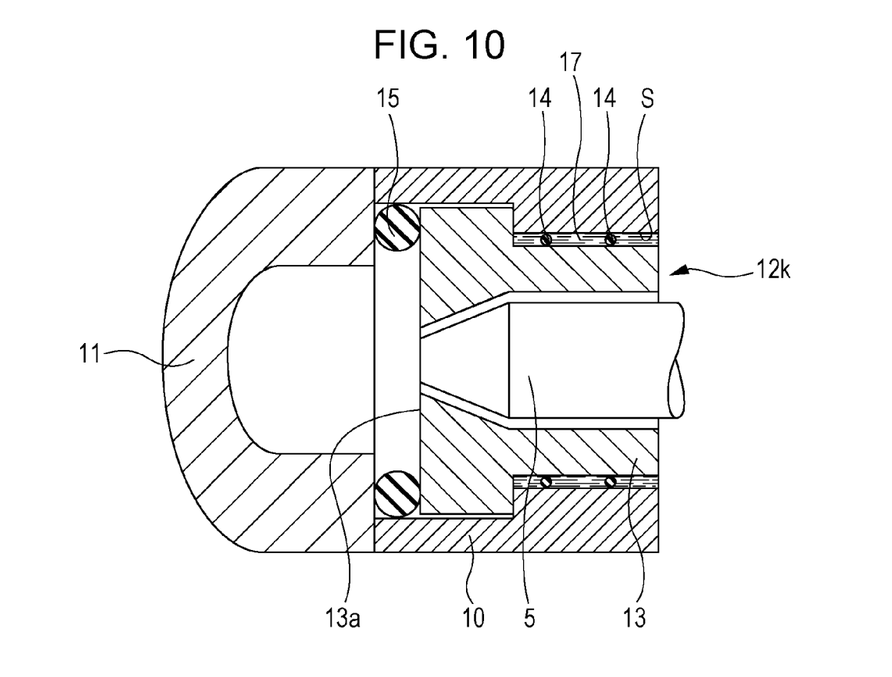
FIG. 10 is a cross-sectional view illustrating a bearing structure according to a modification.

The bearing structure 12j may be modified from various perspectives. The bearing structure 12j may be modified to a bearing structure 12k illustrated in FIG. 10, for example. The bearing structure 12k further includes the viscous substance 17 in the ring-shaped space S as the bearing structure 12h. In this case, the side elastic bodies 14 function as sealing members (end seal) that prevent the viscous substance 17 from escaping. This reduces the consumption of the viscous substance 17 in the ring-shaped space S. In addition, the bearing structure 12k exhibits high vibration damping characteristics.

The bearing structure 12b, the bearing structure 12c, the bearing structure 12d, the bearing structure 12e, the bearing structure 12f, and the bearing structure 12g each may further include the plurality of side elastic bodies 14 arranged in the axial direction of the bearing 13 in the ring-shaped space S as the bearing structure 12j.

The shapes of the components and the combinations of the components described above are examples and may be suitably modified as needed without departing from the scope of the present disclosure.

The turbo machine of the present disclosure is advantageously used as a car supercharger, a gas turbine, a steam turbine, a refrigerator, or an air conditioner.

What is claimed is:
1. A turbo machine comprising:
a cylindrical bearing housing;
a rotation shaft that is located in the cylindrical bearing housing and includes a straight portion having a constant outer diameter;
a bearing that is a plain bearing, that includes a non-tapered hole portion having a constant inner diameter and constituting a portion of the inner surface of the plain bearing that faces the straight portion of the rotation shaft, that is disposed between an inner surface of the cylindrical bearing housing and an outer surface of the rotation shaft, that rotatably supports the rotation shaft in a radial direction of the rotation shaft, and that has one end in an axial direction of the plain bearing, the one end being located in the cylindrical bearing housing;
a bearing holder that is fixed to one end of the cylindrical bearing housing in the axial direction of the plain bearing and that faces the one end of the plain bearing; and
an end elastic body that is disposed between the one end of the plain bearing and the plain bearing holder in the axial direction of the plain bearing, that is in contact with the plain bearing and the bearing holder, and that is formed of a material having a lower modulus of elasticity than a material forming the bearing holder, wherein
the rotation shaft includes a tapered portion having an outer diameter decreasing gradually toward an end of the rotation shaft,
the plain bearing includes a tapered hole portion having an inner diameter decreasing gradually toward the end of the rotation shaft and constituting a portion of the inner surface of the plain bearing that faces the tapered portion of the rotation shaft, and the plain bearing supports a load in the axial direction of the rotation shaft and a load in the radial direction of the rotation shaft, and
the plain bearing separated apart from the rotation shaft.
2. The turbo machine according to claim 1, wherein at least one of the one end of the plain bearing and a surface of the holder that is in contact with the end elastic body has a front recess that houses a portion of the end elastic body.
3. The turbo machine according to claim 1, further comprising at least one side elastic body that is disposed in a ring-shaped space formed between the inner surface of the cylindrical bearing housing and the outer surface of the plain bearing and that is formed of a material having a lower modulus of elasticity than a material forming the inner surface of the cylindrical bearing housing.
4. The turbo machine according to claim 3, wherein the at least one side elastic body comprises a plurality of side elastic bodies, and
the plurality of side elastic bodies are arranged in the axial direction of the plain bearing in the ring-shaped space.
5. The turbo machine according to claim 3, wherein at least one of the inner surface of the cylindrical bearing housing and the outer surface of the plain bearing includes a side recess that houses a portion of the at least one side elastic body.
6. The turbo machine according to claim 1, wherein the plain bearing includes a flange having the one end and a rear end, the one end and the rear end facing opposite directions,
the inner surface of the cylindrical bearing housing has a radial surface facing the rear end, and
the turbo machine further comprises a rear elastic body that is disposed between the rear end and the radial surface in the axial direction of the plain bearing, that is in contact with the plain bearing and the cylindrical bearing housing, and that is formed of a material having a lower modulus of elasticity than a material forming the inner surface of the cylindrical bearing housing.

7. The turbo machine according to claim 1, wherein a gap is formed between the inner surface of the cylindrical bearing housing and the end elastic body over an entire circumference of the end elastic body.

8. The turbo machine according to claim 1, further comprising a viscous substance that is disposed in a ring-shaped space formed between the inner surface of the cylindrical bearing housing and the outer surface of the plain bearing and that has a viscosity of 1 m·Pas to 24 mPa·s at a temperature of 20° C.

* * * * *